United States Patent
Cronin et al.

(10) Patent No.: US 12,313,912 B2
(45) Date of Patent: May 27, 2025

(54) ELECTRONIC CONTACT LENS DATA RECEIVER CIRCUIT

(71) Applicant: Tectus Corporation, Saratoga, CA (US)

(72) Inventors: Timothy Cronin, San Jose, CA (US); Mohammad Hekmat, Portola Valley, CA (US)

(73) Assignee: Tectus Corporation, Saratoga, CA (US)

(\*) Notice: Subject to any disclaimer, the term of this patent is extended or adjusted under 35 U.S.C. 154(b) by 543 days.

(21) Appl. No.: 17/821,778

(22) Filed: Aug. 23, 2022

(65) Prior Publication Data

US 2024/0069364 A1    Feb. 29, 2024

(51) Int. Cl.
  *G02C 7/04* (2006.01)
  *G02C 11/00* (2006.01)
  *H04B 1/3827* (2015.01)
  *H04L 7/033* (2006.01)

(52) U.S. Cl.
  CPC .............. *G02C 11/10* (2013.01); *G02C 7/04* (2013.01); *H04B 1/385* (2013.01); *H04L 7/0331* (2013.01)

(58) Field of Classification Search
  CPC .......... G02C 11/10; G02C 7/04; G02C 7/024; G02C 7/083; H04B 1/385; H04L 7/0331; A61B 3/10
  See application file for complete search history.

(56) References Cited

U.S. PATENT DOCUMENTS

| | | | |
|---|---|---|---|
| 4,495,117 A | 1/1985 | Feurer | |
| 4,498,117 A | 2/1985 | Voyles | |
| 6,289,207 B1 * | 9/2001 | Hudecek | G06F 3/0227 |
| | | | 455/150.1 |
| 7,545,857 B2 | 6/2009 | Liu | |
| 7,546,100 B2 | 6/2009 | Zachan | |
| 7,684,777 B2 | 3/2010 | Lewis | |
| 7,701,299 B2 | 4/2010 | Chenakin | |
| 8,608,310 B2 | 12/2013 | Otis | |
| 8,764,185 B1 | 7/2014 | Biederman | |
| 8,870,370 B1 | 10/2014 | Otis | |
| 8,917,804 B2 | 12/2014 | Sano | |

(Continued)

OTHER PUBLICATIONS 0.13-um CMOS Phase Shifters for X-, Ku-, and K-Band Phased Arrays, Koh et al., IEEE Journal of Solid-State Circuits, vol. 42, No. 11, Nov. 2007, p. 2535.

(Continued)

*Primary Examiner* — Cindy Trandai
(74) *Attorney, Agent, or Firm* — Womble Bond Dickinson (US) LLP

(57) ABSTRACT

An electronic contact lens. In some embodiments, the electronic contact lens includes: a receiver, including: a voltage-controlled oscillator; a phase-alignment circuit, connected to a control input of the voltage-controlled oscillator; and an offset-compensating circuit, connected to the control input of the voltage-controlled oscillator, the receiver being configured: to operate in: a calibration mode, or an operating mode; and to select, in the calibration mode, an operating-mode setting of the offset-compensating circuit, the selecting including: adjusting the offset-compensating circuit, and monitoring an output frequency of the voltage-controlled oscillator.

20 Claims, 5 Drawing Sheets

(56) References Cited

U.S. PATENT DOCUMENTS

| | | | |
|---|---|---|---|
| 8,923,777 B2* | 12/2014 | Nezhad-Ahmadi | H04L 27/10 370/278 |
| 9,024,727 B1 | 5/2015 | Otis | |
| 9,298,020 B1 | 3/2016 | Etzkorn | |
| 9,338,622 B2 | 5/2016 | Bjontegard | |
| 9,641,183 B2 | 5/2017 | Wentzloff | |
| 9,783,159 B1 | 10/2017 | Potter | |
| 9,843,385 B2 | 12/2017 | Deyle | |
| 9,854,437 B1 | 12/2017 | Yeager | |
| 9,860,098 B2 | 1/2018 | Wilkerson | |
| 9,933,620 B2 | 4/2018 | Van Heugten | |
| 10,201,297 B1 | 2/2019 | Biederman | |
| 10,288,909 B1* | 5/2019 | Youssef | H04B 1/48 |
| 10,409,092 B1 | 9/2019 | Youssef | |
| 10,411,745 B1 | 9/2019 | Huang | |
| 10,602,513 B2 | 3/2020 | Winoto | |
| 10,614,737 B1* | 4/2020 | Li | G09G 5/18 |
| 10,897,705 B2 | 1/2021 | Winoto | |
| 11,024,249 B2* | 6/2021 | Kim | G09G 3/3677 |
| 11,841,455 B1* | 12/2023 | Arool Emmanuel | G01S 7/4013 |
| 11,956,414 B2* | 4/2024 | Freeman | G16H 20/30 |
| 12,164,109 B2* | 12/2024 | Patton | G02B 27/017 |
| 2002/0181417 A1 | 12/2002 | Malhotra | |
| 2004/0091053 A1 | 5/2004 | Bargroff | |
| 2005/0154896 A1 | 7/2005 | Widman | |
| 2006/0009180 A1* | 1/2006 | Xu | H04B 1/0039 455/226.1 |
| 2006/0232426 A1 | 10/2006 | Sabeta | |
| 2006/0267768 A1 | 11/2006 | Sabeta | |
| 2007/0274626 A1 | 11/2007 | Sabeta | |
| 2008/0097551 A1 | 4/2008 | Dicks | |
| 2010/0065625 A1 | 3/2010 | Sabeta | |
| 2010/0121315 A1 | 5/2010 | Trovato | |
| 2010/0259719 A1 | 10/2010 | Sabeta | |
| 2011/0028807 A1 | 2/2011 | Abreu | |
| 2011/0084834 A1 | 4/2011 | Sabeta | |
| 2011/0261766 A1 | 10/2011 | Tang | |
| 2012/0030043 A1 | 2/2012 | Ross | |
| 2012/0063340 A1 | 3/2012 | Waters | |
| 2012/0155549 A1 | 6/2012 | Oh | |
| 2012/0245444 A1 | 9/2012 | Otis | |
| 2012/0257585 A1 | 10/2012 | Sydor | |
| 2012/0281181 A1 | 11/2012 | Chen | |
| 2013/0106476 A1* | 5/2013 | Joubert | H03L 1/023 327/156 |
| 2013/0242262 A1 | 9/2013 | Lewis | |
| 2013/0259010 A1 | 10/2013 | Jechoux | |
| 2013/0346168 A1 | 12/2013 | Zhou | |
| 2014/0010089 A1 | 1/2014 | Cai | |
| 2014/0143064 A1 | 5/2014 | Tran | |
| 2014/0178029 A1 | 6/2014 | Raheman | |
| 2014/0222462 A1 | 8/2014 | Shakil | |
| 2014/0240655 A1 | 8/2014 | Pugh | |
| 2015/0053067 A1 | 2/2015 | Goldstein | |
| 2015/0054621 A1 | 2/2015 | Lin | |
| 2015/0057516 A1 | 2/2015 | Mujeeb-U-Rahman | |
| 2015/0119748 A1 | 4/2015 | Lai | |
| 2015/0156645 A1 | 6/2015 | Ponnuswamy | |
| 2015/0173893 A1 | 6/2015 | Portney | |
| 2015/0235267 A1 | 8/2015 | Steube | |
| 2015/0261294 A1 | 9/2015 | Urbach | |
| 2015/0281411 A1 | 10/2015 | Markus | |
| 2015/0326659 A1 | 11/2015 | Cheng | |
| 2015/0363614 A1 | 12/2015 | Yeager | |
| 2016/0099678 A1* | 4/2016 | Kong | H03C 3/0925 331/117 R |
| 2016/0103338 A1 | 4/2016 | Hart | |
| 2016/0174109 A1 | 6/2016 | Yerramalli | |
| 2017/0006632 A1 | 1/2017 | Elliott | |
| 2017/0012972 A1 | 1/2017 | Tanaka | |
| 2017/0042480 A1 | 2/2017 | Gandhi | |
| 2017/0093727 A1 | 3/2017 | Chen | |
| 2017/0168322 A1* | 6/2017 | Toner | H03L 7/00 |
| 2017/0338985 A1 | 11/2017 | Wilkerson | |
| 2017/0371184 A1 | 12/2017 | Shtukater | |
| 2018/0017814 A1 | 1/2018 | Tuan | |
| 2018/0120568 A1 | 5/2018 | Miller | |
| 2018/0136492 A1 | 5/2018 | An | |
| 2018/0149884 A1 | 5/2018 | Miller | |
| 2018/0160321 A1 | 6/2018 | Doherty | |
| 2018/0173304 A1 | 6/2018 | Lemoff | |
| 2018/0203252 A1 | 7/2018 | Perozziello | |
| 2018/0203260 A1 | 7/2018 | Blum | |
| 2018/0210235 A1 | 7/2018 | Boss | |
| 2018/0224669 A1 | 8/2018 | Shtukater | |
| 2018/0224671 A1 | 8/2018 | Lemoff | |
| 2018/0249151 A1 | 8/2018 | Freeman | |
| 2018/0316224 A1 | 11/2018 | Maynard | |
| 2018/0335836 A1 | 11/2018 | Miller | |
| 2018/0348620 A1 | 12/2018 | Miller | |
| 2018/0375703 A1 | 12/2018 | Kellogg | |
| 2019/0041663 A1 | 2/2019 | Goldstein | |
| 2019/0050643 A1 | 2/2019 | Ulman | |
| 2019/0132732 A1 | 5/2019 | Bharti | |
| 2019/0265473 A1 | 8/2019 | Shahmohammadi | |
| 2019/0273727 A1 | 9/2019 | Eckert | |
| 2019/0331937 A1 | 10/2019 | Owens | |
| 2019/0332168 A1 | 10/2019 | Weldemariam | |
| 2020/0029208 A1 | 1/2020 | Winoto | |
| 2020/0037313 A1 | 1/2020 | Winoto | |
| 2020/0201073 A1* | 6/2020 | Lemoff | G02F 1/29 |
| 2020/0312260 A1* | 10/2020 | Kim | G09G 3/3696 |
| 2020/0409458 A1* | 12/2020 | Smithwick | A61B 3/103 |
| 2021/0036560 A1* | 2/2021 | Park | H02J 50/402 |
| 2021/0255753 A1* | 8/2021 | Ahn | G06F 3/04184 |
| 2022/0038804 A1* | 2/2022 | Liao | H04R 1/1091 |
| 2022/0231676 A1* | 7/2022 | Kalyanamahadevi Gopalan Jawarlal | H03L 7/081 |
| 2022/0299797 A1 | 9/2022 | Youssef | |
| 2022/0349938 A1* | 11/2022 | Vezyrtzis | G01R 31/2884 |
| 2022/0360270 A1* | 11/2022 | Jung | H03L 7/199 |
| 2023/0058759 A1* | 2/2023 | Hori | H04L 25/0276 |
| 2023/0102272 A1* | 3/2023 | Casagrande | H04B 1/26 455/552.1 |

OTHER PUBLICATIONS

Chung-Yun Chou and Chung-Yu Wu, "The design of wideband and low-power CMOS active polyphase filter and its application in RF double-quadrature receivers," in IEEE Transactions on Circuits and Systems I: Regular Papers, vol. 52, No. 5, pp. 825-833, May 2005, doi: 10.1109/TCSI.2005.846672.

CMOS Mixers and Polyphase Filters for Large Image Rejection, Behbahani et al., IEEE Journal of Solid-State Circuits, vol. 36, No. 6, Jun. 2001, p. 873.

CMOS Passive Polyphase Filter Design for 2.4 GHz Wireless Communication Applications, Haddad et al., Joint 6th International IEEE Northeast Workshop on Circuits and Systems and TAISA Conference, Montreal, Canada, 2008, 4 pages.

K. T. Christensen, "LC quadrature generation in integrated circuits," ISCAS 2001. The 2001 IEEE International Symposium on Circuits and Systems (Cat. No. 01CH37196), Sydney, NSW, Australia, 2001, pp. 41-44 vol. 1, doi: 10.1109/ISCAS.2001.921783.

Ka/Ku-Band pHEMT Gilbert Mixers With Polyphase and Coupled-Line Quadrature Generators, Su et al., IEEE Transactions on Microwave Theory and Techniques, vol. 57, No. 5, May 2009, p. 1063.

LNA and Mixer Designs for Multi-Band Receiver Front-Ends, N. Poobuapheun, Ph.D. thesis, University of California, Berkeley, 2009, 214 pages.

T. Zhang, M. Taghivand and J. C. Rudell, "A 55-70GHz two-stage tunable polyphase filter with feedback control for quadrature generation with <2° and <0.32dB phase/amplitude imbalance in 28nm CMOS process," ESSCIRC Conference 2015—41st European Solid-State Circuits Conference (ESSCIRC), Graz, Austria, 2015, pp. 60-63, doi: 10.1109/ESSCIRC.2015.7313828.

T. Zhang, V. Subramanian, M. K. Ali and G. Boeck, "Integrated K-Band CMOS passive mixers utilizing balun and polyphase fil-

(56) References Cited

OTHER PUBLICATIONS ters," 2011 IEEE International Symposium on Radio-Frequency Integration Technology, Beijing, China, 2011, pp. 89-92, doi: 10.1109/RFIT.2011.6141778.
Ultra-Low Power Wake-Up Receivers Using N-Path Filtering Techniques, C. Gutierrez, Ph.D. thesis, L'Universite de Lille 1, 2015, 171 pages.

* cited by examiner

ELECTRONIC CONTACT LENS DATA RECEIVER CIRCUIT

FIELD

One or more aspects of embodiments according to the present disclosure relate to electronic contact lenses, and more particularly to radio receivers in such contact lenses.

BACKGROUND

In an electronic contact lens, a radio receiver may employ a phase-alignment circuit to lock the phase of a voltage-controlled oscillator to that of a carrier of a received radio signal. The radio receiver may further employ a phase-locked loop during lock acquisition, to stabilize the voltage-controlled oscillator to a reference signal, so that the phase-alignment circuit may generate a relatively stable error signal. The phase-locked loop may then be disabled, and control of the voltage-controlled oscillator may be performed by the phase-alignment circuit.

It is with respect to this general technical environment that aspects of the present disclosure are related.

BRIEF DESCRIPTION OF THE DRAWINGS

These and other features and advantages of the present disclosure will be appreciated and understood with reference to the specification, claims, and appended drawings wherein:

DETAILED DESCRIPTION

Figure 1A:
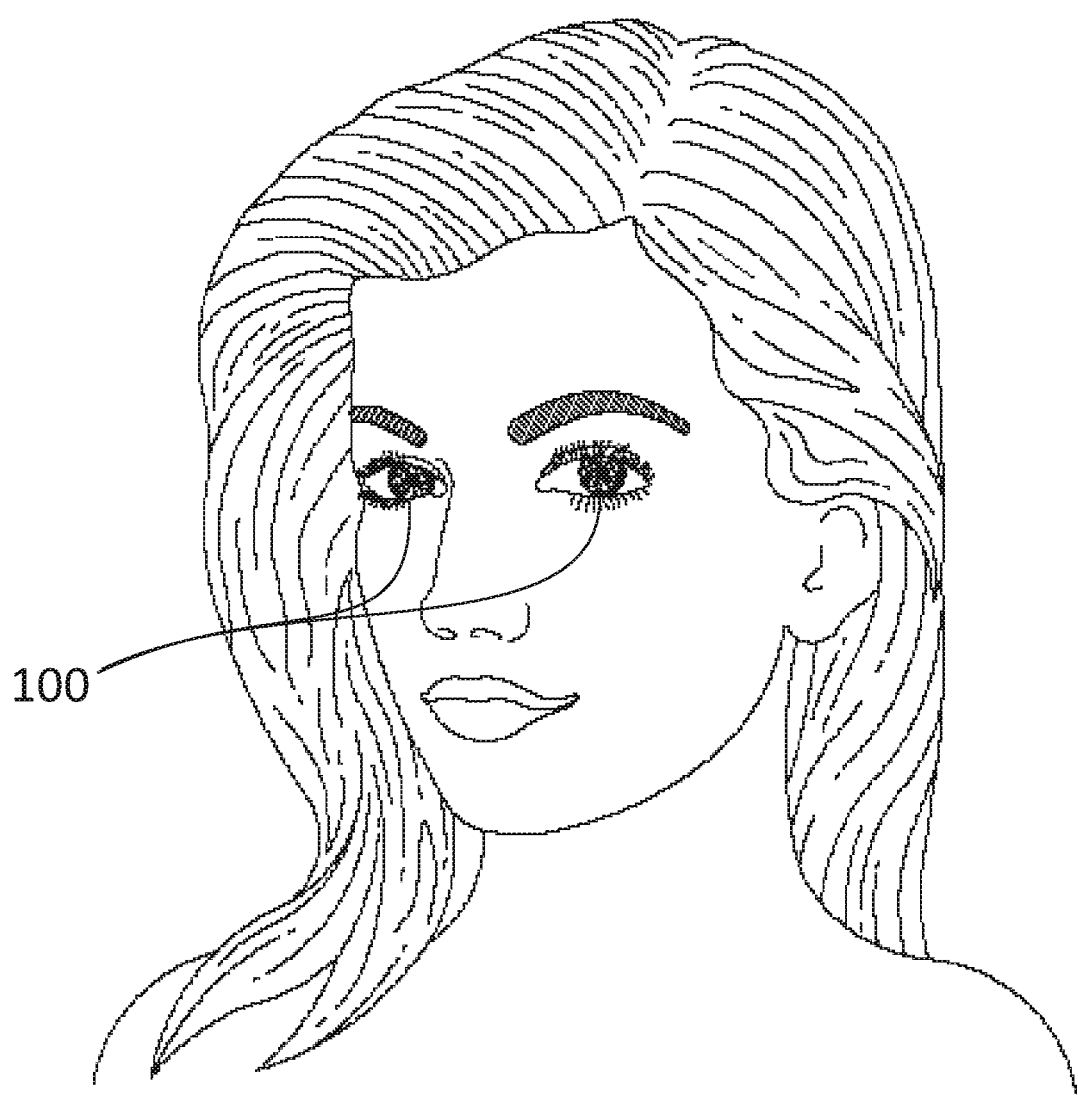
FIG. 1A is an illustration of a wearer wearing two electronic contact lenses, according to an embodiment of the present disclosure.

FIG. 1A shows a wearer wearing a pair of electronic contact lenses 100. The electronic contact lens 100 may include various electronic components, such as a display, a forward-looking imager, motion sensors (such as a gyroscope, an accelerometer, and a magnetometer, the combination of which may be referred to as an inertial measurement unit (IMU)), a radio (e.g., a 5-GHz radio transceiver), a lens controller, batteries, and a power supply circuit. The electronic contact lens 100 may have various functions; for example, (i) it may project images or text onto the wearer's retina, causing the wearer to see the projected images (e.g., augmented reality video) or text superimposed on the external scene the wearer is viewing (or only the projected images or text, if the wearer's eyes are closed), or (ii) it may assist a wearer with low vision using the forward-looking imager. The sensors in the electronic contact lens 100 (e.g., the IMU and the forward-looking imager) may be used to track the wearer's eye movements, so that the displayed images and text may appear, to the wearer, to be stationary, as the wearer's eyes move.

Figure 1B:
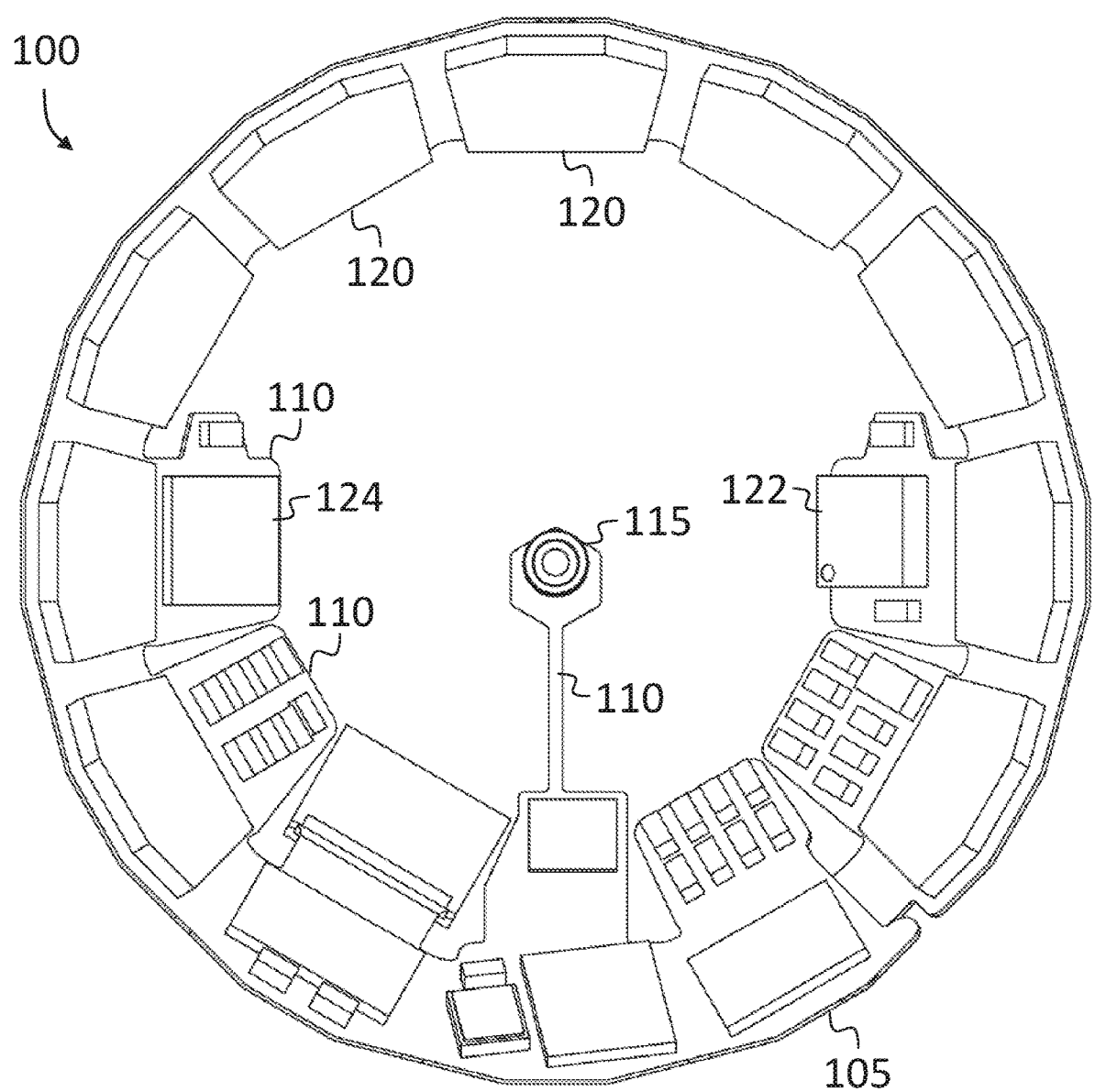
FIG. 1B is a posterior view of an electronic contact lens circuit, according to an embodiment of the present disclosure.

FIG. 1B shows a posterior view of a circuit for an electronic contact lens 100, in some embodiments. The circuit is fabricated as a flexible board 105, with a shape approximating a portion of a sphere, which may be included within the volume of a scleral contact lens. The circuit may be fabricated as an initially flat flexible board 105 (e.g., a plurality of components soldered to a flexible printed circuit) which may be coiled into the shape of a truncated cone with a plurality of extensions 110 for additional circuitry and for the display 115 (which may be a projector configured to project light onto the wearer's retina). Except for the display 115 and the extension 110 supporting it, the circuit may be entirely outside of the area of the wearer's pupil. As mentioned above, the electronic contact lens 100 may also include, for example, a plurality of batteries 120, a radio 122 (which may include a radio transmitter and a radio receiver), a lens controller 124, an imager, an inertial sensor, and a power supply circuit.

The radio receiver in the electronic contact lens 100 may be configured to perform coherent detection of the received radio signal. FIG. 1 shows a circuit that may be used to control an RF oscillator 205, which may be a voltage-controlled oscillator (VCO), so that the voltage-controlled oscillator 205 may be used as a local oscillator for demodulating the received signal. At startup, the radio receiver may operate in an acquisition mode and the circuit of FIG. 2 may use a phase-locked loop to stabilize the frequency of the voltage-controlled oscillator 205 so that it is sufficiently close to the carrier frequency of the received signal that a phase-alignment circuit, e.g., a Costas loop (discussed in further detail below), may acquire lock. As used herein, a "phase-alignment circuit" is a circuit capable of causing the phase of a first signal (e.g., the output of a voltage-controlled oscillator) to become (and remain) aligned with the phase of a second signal (e.g., the output of a reference oscillator, or a received RF signal).

The phase-locked loop may include a reference signal source 210, a phase and frequency detector (PFD) 215, a phase-locked loop charge pump 220, a shunt capacitor 225, and a frequency divider 230. In the acquisition mode, the phase and frequency detector 215 may measure a phase and frequency error between the frequency and phase of the signal from the reference signal source 210 and the output of the frequency divider 230, and the error signal may be used to control the phase-locked loop charge pump 220 to increase or decrease the charge on the capacitor 225 (which sets the voltage at a control input of the voltage-controlled oscillator 205), thereby controlling the frequency and phase of the voltage-controlled oscillator 205, and locking the frequency of the voltage-controlled oscillator 205 to a multiple of the frequency of the reference signal source 210 and align its phase with that of the reference signal source. The capacitor 225 may operate as the loop filter of the voltage-controlled oscillator 205; in some embodiments the loop filter may further include additional elements, e.g., a series combination of additional elements connected in parallel with the capacitor, the series combination including an additional capacitor connected in series with a resistor.

Figure 2:
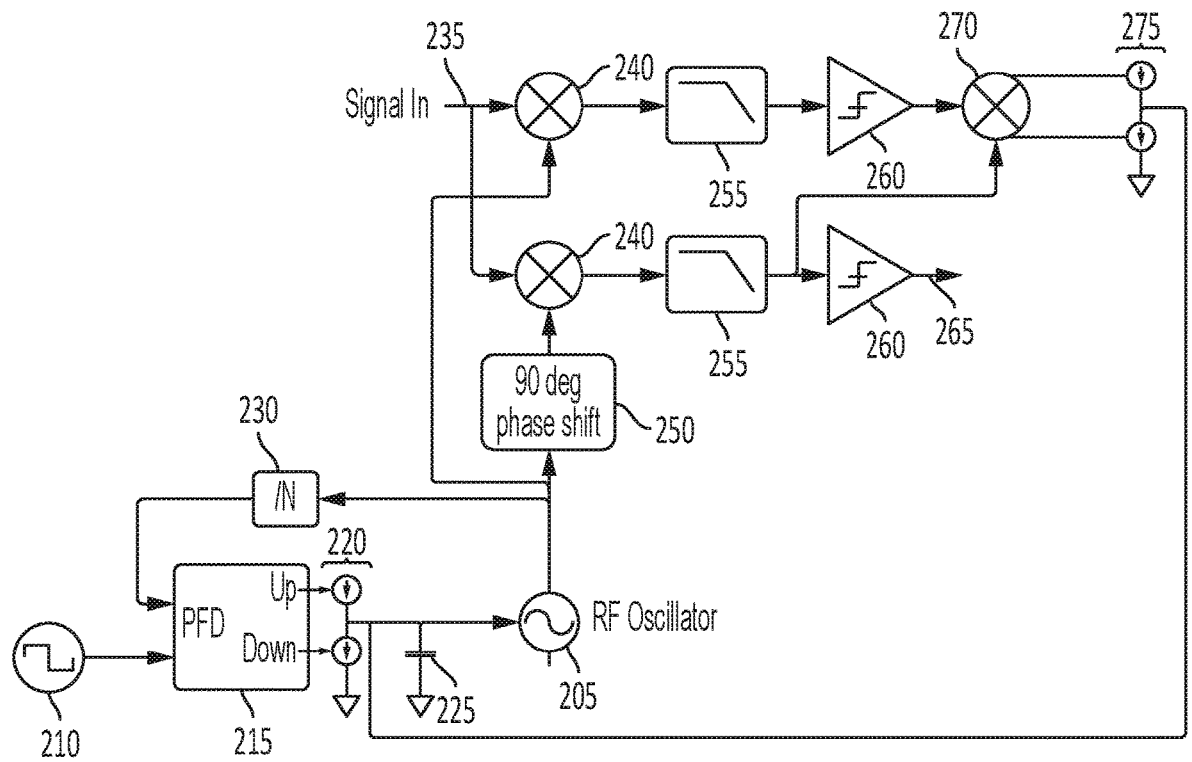
FIG. 2 is a block diagram of a portion of a radio receiver, according to an embodiment of the present disclosure.

In the Costas loop, quadrature demodulation of the RF signal received at the RF input 235 may be performed by an in-phase mixer 240 and a quadrature mixer 245, which receive local oscillator signals from the voltage-controlled oscillator 205, the local oscillator signals differing in phase by 90 degrees, because of a 90-degree phase shift 250 being imposed on the local oscillator signal fed to one of the mixers (relative to the local oscillator signal fed to the other mixer; e.g., a 90-degree phase shift imposed on the signal fed to the in-phase mixer 240, in the circuit of FIG. 2). The received signal may include (e.g., may consist of) a carrier modulated using binary phase-shift keying (BPSK) (or using any other phase shift keying modulation (e.g., quadrature phase shift keying (QPSK), or M-ary phase shift keying (MPSK)), or another modulation such as quadrature amplitude modulation). The in-phase signal may be filtered by a low-pass filter 255 and fed (i) to an in-phase comparator (or "slicer") 260, the output 265 of which carries the demodulated data stream and (ii) to one input of a multiplier 270 (which may be a mixer), the other input of which is fed by the output of a low-pass filter 255 in the quadrature arm. The output of the multiplier feeds a Costas loop charge pump 275, which feeds charge to the capacitor 225. In some embodiments, the 90-degree phase shift is in the RF path instead of being in the local oscillator path.

As mentioned above, once the phase-locked loop has settled, the frequency may be sufficiently stable and sufficiently close to the carrier frequency of the RF signal received at the RF input 235 for the Costas loop to lock to the carrier of the RF signal. At this point the radio receiver may transition from the acquisition mode to an operating mode, in which the phase-locked loop may be disabled and the Costas loop may control the voltage-controlled oscillator 205.

The phase-locked loop charge pump 220 may be a significantly larger charge pump than the Costas loop charge pump 275 (e.g., the former may be constructed with larger transistors and be capable or sourcing or sinking significantly more current than the latter). As such, the leakage current from the phase-locked loop charge pump 220 when the phase-locked loop is disabled may be sufficiently great to overpower the Costas loop charge pump 275, e.g., the leakage current of the former may exceed the capacity of the Costas loop charge pump 275 to source or sink an opposite current. In this circumstance, the Costas loop may be unable to lock.

Figure 3A:
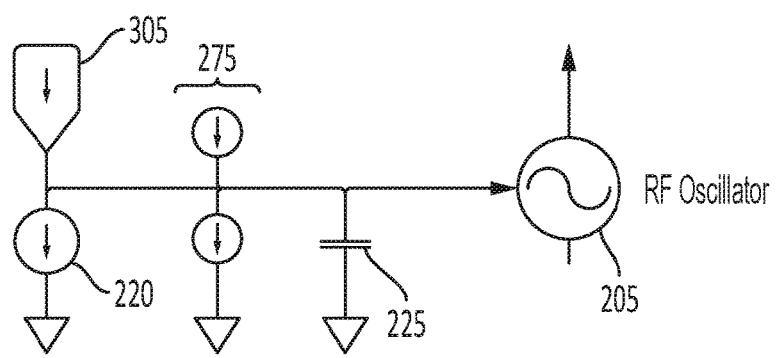
FIG. 3A is a block diagram of a portion of a radio receiver, according to an embodiment of the present disclosure.

Referring to FIG. 3A, to avoid this behavior, an offset-compensating circuit 305 may supply an offsetting current to the capacitor 225. The offsetting current may be added to the leakage current from the phase-locked loop and the current from the Costas loop charge pump 275, and it may partially cancel (e.g., cancel some or all of) the leakage current of the phase-locked loop. This offset-compensating circuit may be or include a digitally controlled current source such as a digital to analog converter (DAC), e.g., it may be or include a current DAC which sources or sinks a current corresponding to a digital control word received by and stored in the offset-compensating circuit. In FIG. 3A, the phase-locked loop charge pump 220 is represented as a single current source sinking a leakage current; in some circumstances this leakage current may be negative and current may flow into the capacitor 225 instead. As used herein, a "current" may be positive or negative; as such, if a circuit supplies a current, e.g., to the capacitor 225, the current may flow from the circuit into the capacitor, or it may be a (negative) current flowing into the circuit from the capacitor.

Various methods may be used to select an operating-mode setting for the offset-compensating circuit 305, the operating-mode setting being a setting that will cause the offset-compensating circuit 305, in operating mode, to source or sink a current partially or fully canceling the leakage current of the phase-locked loop so that the Costas loop is able to maintain phase lock. In some embodiments, the setting is determined during fabrication, by (i) connecting an analog-to-digital converter (ADC) to a test pad connected to the control input of the voltage-controlled oscillator 205 (and to the capacitor 225), (ii) disabling the phase-locked loop and the Costas loop, and (iii) adjusting the setting of the offset-compensating circuit 305 until it nearly cancels the leakage current from the phase-locked loop (as evidenced by a steady or slowly changing voltage at the test pad). This setting of the offset-compensating circuit 305 may then be used for the life of the electronic contact lens 100. In other embodiments, (e.g., if a one-time setting of the offset-compensating circuit 305 is not sufficient (e.g., because the leakage current of the phase-locked loop varies with temperature)), the analog-to-digital converter may be part of the electronic contact lens 100 (e.g., being fabricated on the receiver chip, or on a separate chip). A controller (e.g., a processor core) may then perform the setting of the offset-compensating circuit 305 periodically, by disabling the phase-locked loop and the Costas loop and adjusting the setting of the offset-compensating circuit 305 until it nearly cancels the leakage current from the phase-locked loop.

Figure 3B:
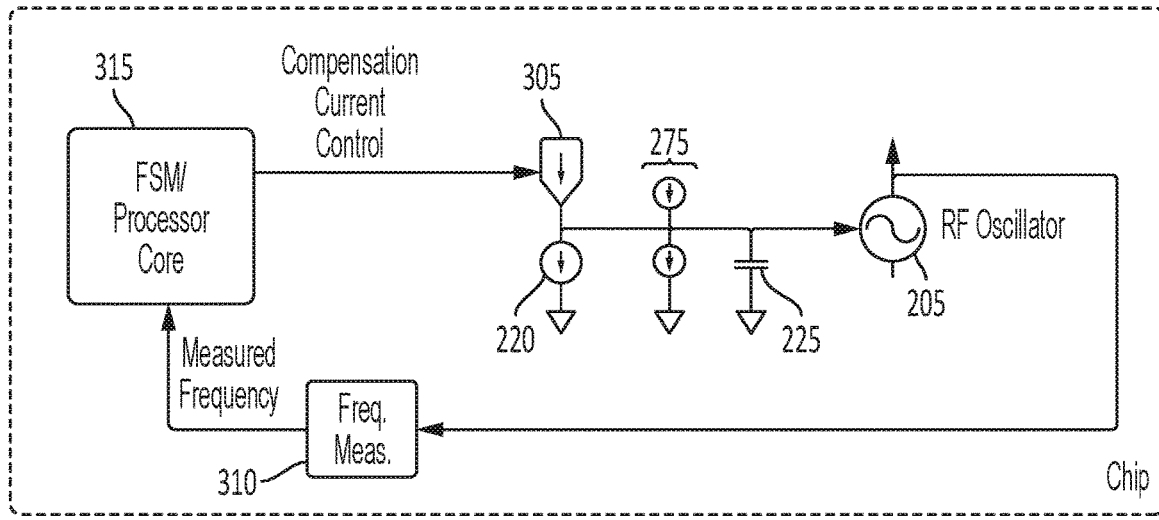
FIG. 3B is a block diagram of a portion of a radio receiver, according to an embodiment of the present disclosure.

It may however not be feasible to include an analog-to-digital converter in the electronic contact lens 100, because, e.g., an analog-to-digital converter would consume an unacceptable amount of power or take up an unacceptable amount of space. As such, a calibration mode not requiring an analog-to-digital converter may be employed (e.g., when the radio receiver is first powered up, or periodically thereafter, or when the temperature of the electronic contact lens 100 changes by more than a threshold amount, as measured by a temperature sensor of the electronic contact lens 100) to select the operating-mode setting for the offset-compensating circuit 305. Referring to FIG. 3B, in the calibration mode, both the phase-locked loop and the Costas loop may be disabled, and a frequency measuring circuit 310 and a processing circuit 315 (e.g., a finite state machine or a processor core) may iteratively adjust the offset-compensating circuit 305 (e.g., adjust the offset current produced by the offset-compensating circuit 305), while monitoring the output frequency of the voltage-controlled oscillator to determine how to adjust the current or when the offset current is adequately calibrated.

Figure 3C:
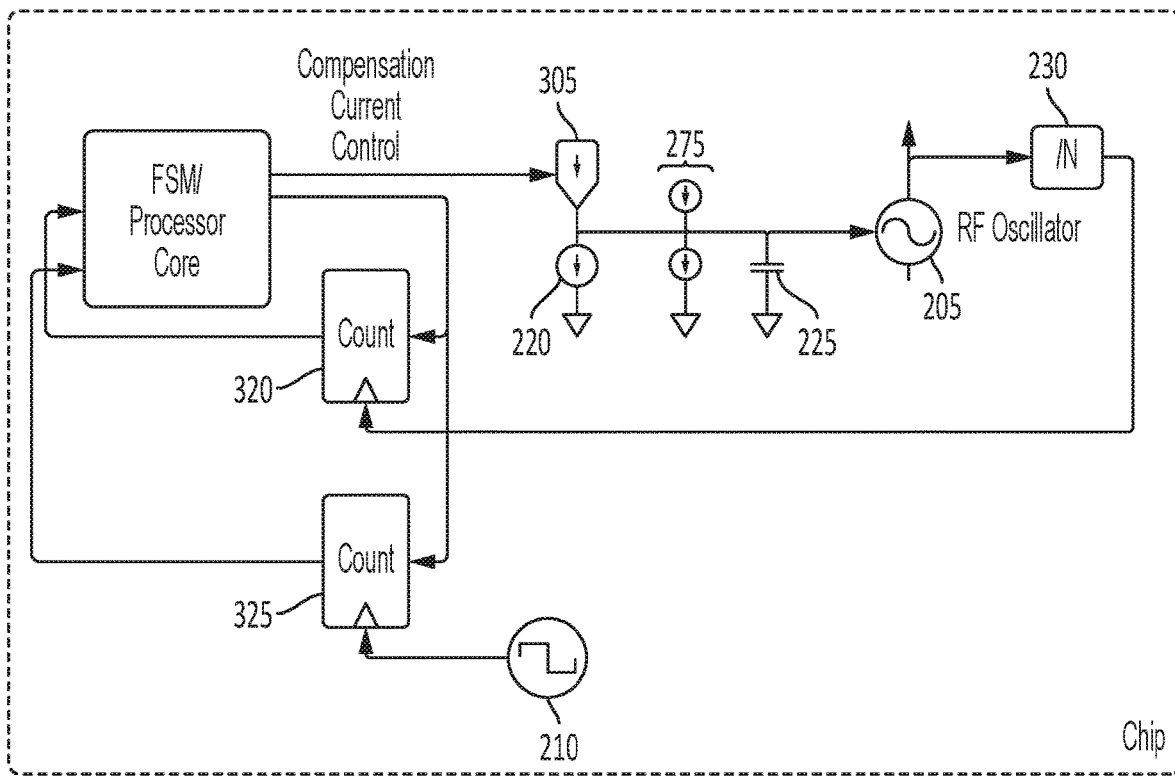
FIG. 3C is a block diagram of a portion of a radio receiver, according to an embodiment of the present disclosure.

FIG. 3C shows an embodiment in which the frequency measuring circuit 310 is implemented using two counters, a first counter 320 that counts edges of the output of the RF oscillator (or, as shown, of the output of a frequency divider 230 the input of which is connected to the output of the RF oscillator) and a second counter 325 that counts edges of a reference signal. The two counters may be employed to measure the frequency of the voltage-controlled oscillator 205 by measuring the relative frequencies of (i) the signal at the output of the frequency divider 230 and (ii) the reference signal. This may be accomplished, for example, by resetting both counters simultaneously, then allowing both counters to count during some interval of time, and then calculating the measured frequency of the voltage-controlled oscillator 205 as $$f_{RF} = Nf_{clk} \frac{\text{Oscillator cycles}}{\text{Real time cycles}}$$

where N is the divider ratio of the frequency divider 230, $f_{clk}$ is the frequency of the reference signal, Oscillator cycles is the number of counts accumulated, at the end of the interval, by the first counter 320 and Real time cycles is the number of counts accumulated, at the end of the interval, by the second counter 325. The time interval may be set to end when (i) the first counter 320 has reached a threshold or (ii) the second counter 325 has reached a threshold or (iii) each of the first counter 320 and the second counter 325 has reached respective threshold (which may be the same for both the first counter 320 and the second counter 325). All of the components shown in each of FIGS. 3B and 3C may be on a single integrated circuit, or "chip", as shown. Counters such as those shown in FIG. 3C may be readily fabricated in any digital integrated circuit process (e.g., any complementary metal oxide semiconductor (CMOS) process), and their behavior (unlike, e.g., the behavior of some analog-to-digital converter designs) may be largely independent of the integrated circuit fabrication process used or temperature or other environmental factors.

Figure 4:
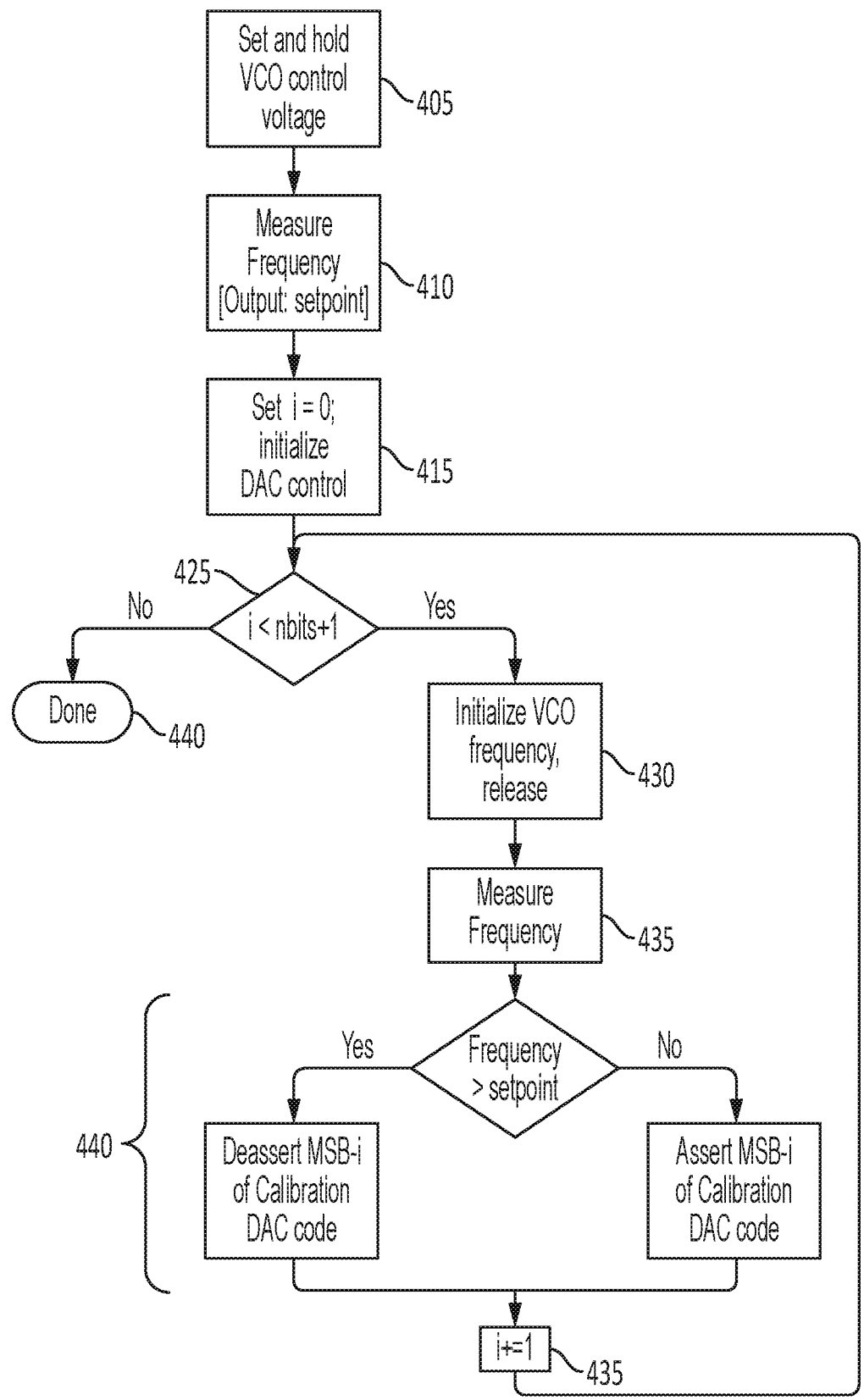
FIG. 4 is a flow chart of a method, according to an embodiment of the present disclosure.

In the systems of FIGS. 3B and 3C, the calibration procedure may proceed as illustrated in FIG. 4. For the description that follows, it is assumed that (i) the frequency of the voltage-controlled oscillator 205 increases with increasing control voltage and (ii) that larger values of the DAC control word result in more current being driven into the capacitor 225 by the current DAC. These assumptions are made without loss of generality because analogous methods may be used if either or both of the assumptions do not hold in a particular circuit.

At 405, the voltage on the capacitor 225 (and the control voltage of the voltage-controlled oscillator 205) may be fixed (e.g., the capacitor may be shorted to ground, so that the control input of the voltage-controlled oscillator 205 is at 0 V, or connected to a reference voltage, or the phase-locked loop may be turned on, causing the control voltage of the voltage-controlled oscillator (and the voltage on the capacitor) to be set to the voltage at which the voltage-controlled oscillator 205 is locked to a multiple of the frequency of the reference signal source 210). The frequency of the voltage-controlled oscillator 205 may then be measured, at 410; this measurement may be used as a setpoint for subsequent steps. At 415, a bit index, i, may be set to zero and the DAC control word may be set to minimize the current, e.g., the most significant bit (MSB) may be set to 1, and the remaining bits may be set to 0. The phase-locked loop charge pump 220 and the Costas loop charge pump 275 may both be disabled, so that from the two charge pumps only leakage currents (of which the leakage current of the Costas loop charge pump 275 may be negligible) contribute to charge flowing into or out of the capacitor 225. In a loop beginning at 425, each bit of the DAC control word may then be set, beginning with the most significant bit, one bit being set during each iteration of the loop. For each value of i, the control voltage of the voltage-controlled oscillator 205 may, at 430, be (i) initialized by turning on the phase-locked loop temporarily, by temporarily shorting the control input of the voltage-controlled oscillator 205 and the capacitor 225 to ground, or by connecting it to a reference voltage, and (ii) released. In some embodiments, the method used to initialize the control voltage each time step 430 is performed is the same as the method used to initialize (or "set and hold") the control voltage in step 405, so that the voltage to which the control voltage is initialized is substantially the same each time one of these two steps is performed.

The frequency of the voltage-controlled oscillator 205 may then be measured at 435. If, upon being released, the frequency of the voltage-controlled oscillator 205 increases (to be greater than the setpoint), it may be inferred that a net inflow of charge into the capacitor is present; if instead the frequency of the voltage-controlled oscillator 205 decreases (to be less than the setpoint), it may be inferred that a net outflow of charge from the capacitor is present As such, at 440, the current bit of the DAC (the $i^{th}$ bit from the MSB) may be (i) set to 0 (or left at 0 if it is already 0) if the measured frequency is greater than the setpoint, or (ii) set to 1 (or left at 1 if it is already 1) if the measured frequency is less than the setpoint. The index i may then be incremented at 435, and, at 425, compared to the final value (nbits+1); once i has reached the final value (and each bit of the DAC has been set to 0 or 1 based on a respective frequency measurement), the process ends, at 440.

In the embodiment of FIG. 4 the frequency of the voltage-controlled oscillator 205 is monitored by repeatedly measuring it as adjustments to the offset current are made. In some embodiments the monitoring of the frequency of the voltage-controlled oscillator 205 may be performed differently, e.g., a circuit for measuring the rate of change of the frequency of the voltage-controlled oscillator 205 may be used to determine whether the frequency increases or decreases after the control voltage is released.

As used herein, "a portion of" something means "at least some of" the thing, and as such may mean less than all of, or all of, the thing. As such, "a portion of" a thing includes the entire thing as a special case, i.e., the entire thing is an example of a portion of the thing. Similarly, as used herein, "partially" means "at least partially", and, for example, if a first current partially offsets or cancels a second current, the first current may completely offset of cancel the second current. As used herein, the word "or" is inclusive, so that, for example, "A or B" means any one of (i) A, (ii) B, and (iii) A and B. It will be understood that when an element is referred to as being "directly connected" or "directly coupled" to another element, there are no intervening elements present. As used herein, "generally connected" means connected by an electrical path that may contain arbitrary intervening elements, including intervening elements the presence of which qualitatively changes the behavior of the circuit. As used herein, "connected" means (i) "directly connected" or (ii) connected with intervening elements, the intervening elements being ones (e.g., low-value resistors or inductors, or short sections of transmission line) that do not qualitatively affect the behavior of the circuit.

Although exemplary embodiments of an offset compensation circuit for a phase-alignment circuit have been specifically described and illustrated herein, many modifications and variations will be apparent to those skilled in the art. Accordingly, it is to be understood that an offset compensation circuit for a phase-alignment circuit constructed according to principles of this disclosure may be embodied other than as specifically described herein. The invention is also defined in the following claims, and equivalents thereof.

What is claimed is:

1. An electronic contact lens, comprising: a receiver, comprising: a voltage-controlled oscillator; a phase-alignment circuit, connected to a control input of the voltage-controlled oscillator; and an offset-compensating circuit, connected to the control input of the voltage-controlled oscillator, the receiver being configured: to operate in: a calibration mode, or an operating mode; and to select, in the calibration mode, an operating-mode setting of the offset-compensating circuit, the selecting comprising: adjusting the offset-compensating circuit, and monitoring an output frequency of the voltage-controlled oscillator, wherein the receiver is configured to receive image data, and the electronic contact lens is configured to display the image data, wherein the selecting comprises: determining that a first offset-compensating current corresponds to a first measured output frequency of the voltage-controlled oscillator: determining that a second offset-compensating current corresponds to a second measured output frequency of the voltage-controlled oscillator, higher than the first measured output frequency of the voltage-controlled oscillator; and selecting a third offset-compensating current, the third offset-compensating current being between the first offset-compensating current and the second offset-compensating current.

2. The electronic contact lens of claim 1, wherein the phase-alignment circuit is configured, in the operating mode, to align a phase of the voltage-controlled oscillator with a phase of a received signal.

3. The electronic contact lens of claim 1, wherein the phase-alignment circuit comprises a Costas loop.

4. The electronic contact lens of claim 1, wherein:
the receiver further comprises a phase-locked loop; and
the receiver is further configured to operate in an acquisition mode, the phase-locked loop being configured, in the acquisition mode, to lock the phase of the voltage-controlled oscillator to the phase of a reference signal.

5. The electronic contact lens of claim 4, wherein:
in the calibration mode, the phase-locked loop is disabled, and
the adjusting of the offset-compensating circuit comprises adjusting the offset-compensating circuit to partially offset a leakage current from the phase-locked loop.

6. The electronic contact lens of claim 1, wherein the receiver further comprises a shunt capacitor connected to the control input of the voltage-controlled oscillator, wherein the offset-compensating circuit is configured to supply an adjustable offset-compensating current to the shunt capacitor.

7. The electronic contact lens of claim 6, wherein the offset-compensating circuit comprises a digitally controlled current source.

8. The electronic contact lens of claim 1, wherein the receiver further comprises a divider connected to an output of the voltage-controlled oscillator.

9. The electronic contact lens of claim 8, wherein the receiver further comprises a first counter connected to an output of the divider.

10. The electronic contact lens of claim 9, wherein the receiver further comprises a second counter connected to an output of a reference signal source.

11. The electronic contact lens of claim 10, wherein the monitoring of the output frequency of the voltage-controlled oscillator comprises calculating the output frequency of the voltage-controlled oscillator based on:
a count accumulated in the first counter during an interval of time, and
a count accumulated in the second counter during the interval of time.

12. The electronic contact lens of claim 1, wherein the monitoring of the output frequency of the voltage-controlled oscillator comprises:
monitoring the output frequency of the voltage-controlled oscillator during a first interval of time, with the control input of the voltage-controlled oscillator set to a fixed voltage; and
monitoring the output frequency of the voltage-controlled oscillator during a second interval of time, with:
the control input of the voltage-controlled oscillator connected to a capacitor; and
a charge on the capacitor changing according to a net current flowing into or out of the capacitor, the net current including a contribution from the offset-compensating circuit.

13. A method, comprising: operating a receiver, of an electronic contact lens, in a calibration mode; and operating the receiver in an operating mode, the receiver comprising: a voltage-controlled oscillator; a phase-alignment circuit, connected to a control input of the voltage-controlled oscillator; and an offset-compensating circuit, connected to the control input of the voltage-controlled oscillator, the operating of the receiver in the calibration mode comprising selecting an operating-mode setting of the offset-compensating circuit, the selecting comprising: adjusting the offset-compensating circuit, and monitoring an output frequency of the voltage-controlled oscillator, wherein the selecting comprises: determining that a first offset-compensating current corresponds to a first measured output frequency of the voltage-controlled oscillator; determining that a second offset-compensating current corresponds to a second measured output frequency of the voltage-controlled oscillator, higher than the first measured output frequency of the voltage-controlled oscillator; and selecting a third offset-compensating current, the third offset-compensating current being between the first offset-compensating current and the second offset-compensating current.

14. The method of claim 13, wherein the operating of the receiver in the operating mode comprises causing, by the phase-alignment circuit, a phase of the voltage-controlled oscillator to be aligned with a phase of a received signal.

15. The method of claim 13, wherein the phase-alignment circuit comprises a Costas loop.

16. The method of claim 13, further comprising:
operating the receiver in an acquisition mode,
wherein:
the receiver further comprises a phase-locked loop; and
the operating of the receiver in the acquisition mode comprises locking, by the phase-locked loop, the phase of the voltage-controlled oscillator to the phase of a reference signal.

17. The method of claim 16, wherein:
in the calibration mode, the phase-locked loop is disabled, and
the adjusting of the offset-compensating circuit comprises adjusting the offset-compensating circuit to partially offset a leakage current from the phase-locked loop.

18. The method of claim 13, wherein:
the receiver further comprises a shunt capacitor connected to the control input of the voltage-controlled oscillator; and
the offset-compensating circuit is configured to supply an adjustable offset-compensating current to the shunt capacitor.

19. The method of claim 18, wherein the offset-compensating circuit comprises a digitally controlled current source.

20. An electronic contact lens, comprising: a receiver, comprising: a voltage-controlled oscillator; a phase-alignment circuit, connected to a control input of the voltage-controlled oscillator; and an offset-compensating circuit, connected to the control input of the voltage-controlled oscillator, the receiver being configured: to operate in: a calibration mode, or an operating mode; and to select, in the calibration mode, an operating-mode setting of the offset-compensating circuit, the selecting comprising: adjusting the offset-compensating circuit, and monitoring an output frequency of the voltage-controlled oscillator, wherein the selecting comprises: determining that a first offset-compensating current corresponds to a first measured output frequency of the voltage-controlled oscillator; determining that a second offset-compensating current corresponds to a second measured output frequency of the voltage-controlled oscillator, higher than the first measured output frequency of the voltage-controlled oscillator; and selecting a third offset-compensating current, the third offset-compensating current being between the first offset-compensating current and the second offset-compensating current.

* * * * *